Figure 1:
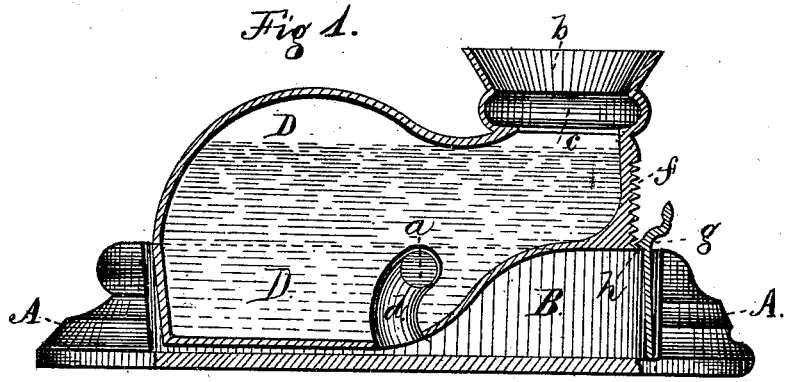

W. J. SCHILLING.
INKSTANDS.

No. 180,652.

2 Sheets—Sheet 1.

Patented Aug. 1, 1876.

Witnesses:
E. S. Ward.
James Wells.

Inventor:
William J. Schilling
By H. J. Hunton
Atty.

2 Sheets—Sheet 2.
W. J. SCHILLING.
INKSTANDS.
No. 180,652. Patented Aug. 1, 1876.
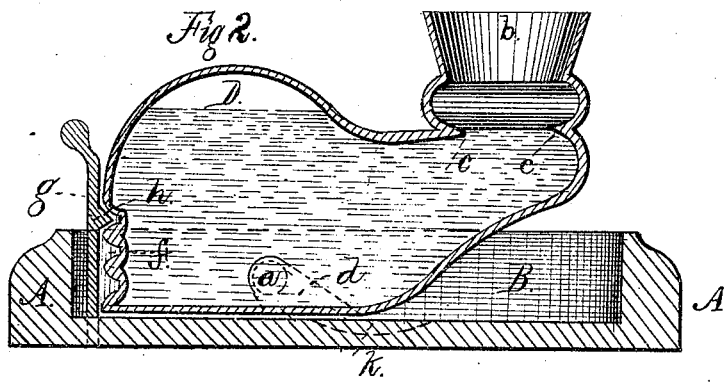
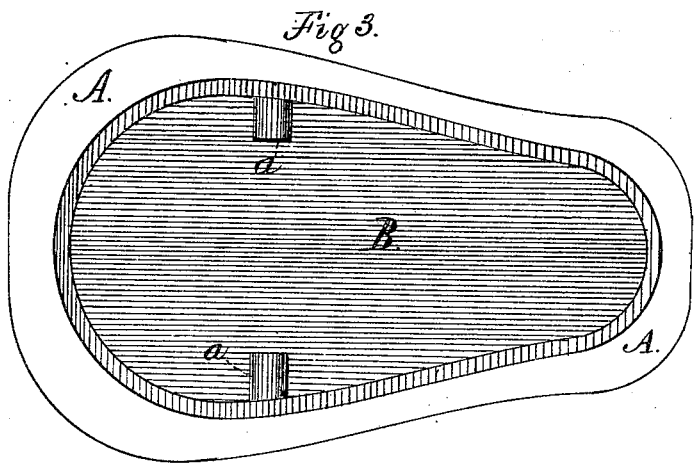
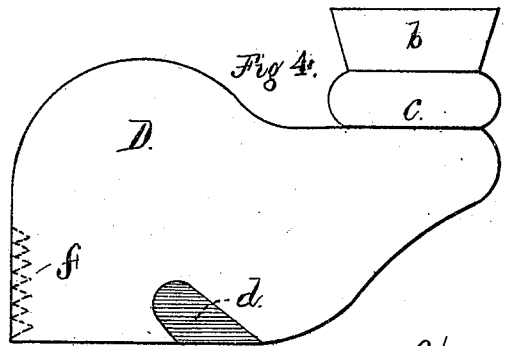
Witnesses:
Lewis Wittmann
E. G. Ward
Inventor:
William J. Schilling
By A. S. Munson
Atty.

UNITED STATES PATENT OFFICE.

WILLIAM J. SCHILLING, OF NEW YORK, N. Y.

IMPROVEMENT IN INKSTANDS.

Specification forming part of Letters Patent No. 180,652, dated August 1, 1876; application filed April 1, 1876.

*To all whom it may concern:*

Be it known that I, WILLIAM J. SCHILLING, of the city, county, and State of New York, have invented certain new and useful Improvements in Mucilage and Ink Stands, of which the following is a specification:

This invention relates to that class of vessels usually constructed from glass, and known as mucilage and ink stands; and it consists in the production of such an article in two parts, so arranged that the vessel may be rocked on pivots or trunnions arranged in a solid base, so as to throw the fluid forward, into a narrow well in the neck, from which it is drawn by the brush or pen, the arrangement, construction, and operation of which will be hereinafter fully pointed out and described.

In the drawings, which are an essential part of this specification, Figure 1 is a vertical section of an apparatus, in which is fully embodied my invention. Fig. 2 is the same, showing a modification. Fig. 3 is a plan view of the base or stand, the fluid-vessel being removed, and Fig. 4 is a detached elevation of the fluid-vessel.

Similar letters of reference found in the various figures of the drawings will locate and point out corresponding parts.

The object of this invention is the production of a vessel for use as a mucilage or ink stand, which shall be so constructed and operated that but a small quantity of its contents is delivered into the well in the mouth or neck, from which it is to be drawn by the brush or pen, and which, as the consumption progresses, is capable of being adjusted into a new position, delivering more fluid to the well until all or the greater part of the contents of the vessel has been drawn therefrom, the intention being to retain the bulk of the fluid from the effects of the atmosphere and evaporating influences and delivering it for use in small quantities.

In carrying out my invention I construct the apparatus in two parts, a base or stand, and a liquid-vessel, which is mounted in such base or stand on suitable trunnions provided for that purpose.

A represents the base or stand, its exterior being in the form as shown in Figs. 1, 2, and 3. It is usually about one inch in height, and has formed in its body a well, B, which receives the base of the liquid-vessel. On the interior of the stand A, projecting from the sides of the well B, are two studs or trunnions, *a a*, shown best in Figs. 1 and 3, also in dotted lines in Fig. 2. These trunnions project about one-half of an inch, but they may be more or less and still fully answer the purposes. This base or stand may be constructed from cast metal, and ornamented by japanning, painting, plating, or other method of ornamentation, or it may be made from glass, as taste and fancy may call for. D is the vessel or bottle in which the mucilage or ink is placed. It is shown in its normal position in Figs. 1 and 2, and adjusted in place in the stand B. It is provided with a funnel-shaped mouth, *b*, and neck *c*, the base of which projects inwardly, as shown, providing a sharp edge, against which to wipe the brush when used for mucilage. In its base and on both sides it is provided with recesses *d d*, which retire at an angle, as shown in Figs. 1 and 2. These recesses, when the vessel is placed in the stand, slip over the trunnions *a a* into the position as shown in Figs. 1 and 2. It will be understood that these recesses extend into the vessel on each side no farther than is necessary to take in the trunnions *a a*; hence the capacity of the vessel is not curtailed or divided in its center by them. In the front of vessel D, and centrally, are formed a series of serrations, corrugations, or ratchet-teeth, *f*. (Seen best in Fig. 1.) They are in a perpendicular line, and need not be over one-eighth of an inch wide, and they may be as fine and more or less in number as circumstances may call for. In the front of the vessel D, when it is in position in the stand B, is placed a spring, *g*, provided with a single spur or catch, *h*, which engages in the serrations *f*. It is secured in the base of the stand, as shown, or it may be applied in any desired way so as to engage with the serrations. It may be made of steel, rubber, or any other suitable elastic material, and in such form as the space in between the vessel and the inner face of the stand will permit. In some cases I propose to form the serrations $f$ on the rear of the vessel, as shown in Fig. 2, and to apply the spring $g$ in a similar manner, as previously described.

I do not confine myself to the use of the form of spring as shown, but shall use any suitable spring that will be readily adapted to engage with the ratchet-teeth.

The operation of the apparatus will be as follows: To insert the vessel D in the stand, throw the spring $g$ forward. The vessel will then be readily set upon the trunnions $a\,a$, which engage in the curved recesses $d\,d$. The spring $g$ is then released, and it at once presses against the serrated face of the vessel, its catch or spur $h$ entering one of the teeth $f$. It is obvious that the vessel will thus be firmly held in its place on the trunnions, and that it cannot be removed or escape therefrom until the spring is retracted. When the serrations and spring are used at the rear of the vessel and stand, as shown in Fig. 2, precisely similar results are accomplished. The vessel being in the position as shown in Figs. 1 and 2, the mucilage or ink reaches into the mouth or neck $c$, as shown, when the liquid is drawn so low that the supply is limited, the spring is withdrawn from the serrations, and the vessel tipped forward, the spring catching into a higher or lower tooth, as the case may be, and according to the depression given the vessel, which tipping or depression causes a flow of liquid to the neck. This operation may be continued until the heel of the vessel is lifted high enough to throw nearly all of the fluid in the vessel forward into the neck thereof. As the neck of the vessel is depressed into the stand it enters a recess, K, (shown in dotted lines in Fig. 2,) cut therein to receive it.

It is plainly apparent that my invention is applicable to both ink and mucilage stands, and that the shape of the neck of the vessel may be varied to meet the requirements of the two cases.

Having thus fully described my invention, what I claim as new and useful, and desire to secure by Letters Patent, is—

1. In a mucilage or ink stand, the combination of a base or stand provided with trunnions projecting on its interior, and an adjustable tilting liquid-vessel provided with a ratchet or serrations on its front or rear, arranged, applied, and operating as and for the purposes substantially as herein shown and described.

2. The combination of the recessed base or stand A, provided with trunnions $a\,a$, and liquid-vessel D, having angular recesses $d\,d$ in its base and sides, and provided on its front or rear with serrations or ratchet-teeth $f$, arranged and operating substantially as and for the purposes as herein shown and set forth.

3. In combination with the recessed stand A and liquid-vessel D, having serrations or ratchet-teeth $f$ on its front or rear, the adjusting-spring $g$, provided with a spur or catch, $h$, arranged and operating substantially as and for the purposes as herein shown and set forth.

In testimony whereof I have hereunto set my hand this 7th day of March, A. D. 1876.

WILLIAM J. SCHILLING.

In presence of—
  A. L. MUNSON,
  E. G. WARD.